United States Patent
Kim et al.

(10) Patent No.: US 10,323,905 B2
(45) Date of Patent: Jun. 18, 2019

(54) LASER SHOOTING TRAINING SYSTEM AND METHOD

(71) Applicant: REPUBLIC OF KOREA (AIR FORCE LOGISTICS COMMAND 83TH INFORMATION AND COMMUNICATION MAINTENANCE DEPOT), Daegu (KR)

(72) Inventors: Byung Ki Kim, Daegu (KR); Ju Hyun Choi, Daegu (KR)

(73) Assignee: REPUBLIC OF KOREA (AIR FORCE LOGISTICS COMMAND 83TH INFORMATION AND COMMUNICATION MAINTENANCE DEPOT), Daegu (KR)

( * ) Notice: Subject to any disclaimer, the term of this patent is extended or adjusted under 35 U.S.C. 154(b) by 454 days.

(21) Appl. No.: 15/038,063

(22) PCT Filed: Aug. 6, 2014

(86) PCT No.: PCT/KR2014/007287
§ 371 (c)(1),
(2) Date: May 20, 2016

(87) PCT Pub. No.: WO2015/088121
PCT Pub. Date: Jun. 18, 2015

(65) Prior Publication Data
US 2016/0305744 A1    Oct. 20, 2016

(30) Foreign Application Priority Data
Dec. 10, 2013  (KR) ................. 10-2013-0153453

(51) Int. Cl.
*F41G 3/26*    (2006.01)
*F41G 3/32*    (2006.01)
(Continued)

(52) U.S. Cl.
CPC ............ *F41G 3/2655* (2013.01); *F41A 33/02* (2013.01); *F41G 3/32* (2013.01); *F41J 5/02* (2013.01);
(Continued)

(58) Field of Classification Search
CPC . F41G 3/2655; F41G 3/32; F41G 3/26; F41A 33/02; F41J 5/02; F41J 5/08; F41J 5/14; G06K 9/4604; G06T 7/0002
See application file for complete search history.

(56) References Cited

U.S. PATENT DOCUMENTS

| | | | | |
|---|---|---|---|---|
| 2002/0051953 A1* | 5/2002 | Clark | ....................... | F41A 33/02 434/16 |
| 2003/0195046 A1* | 10/2003 | Bartsch | ................... | F41A 33/02 463/49 |
| 2013/0279749 A1* | 10/2013 | Kaiser-Pendergrast | | ...................... G06K 9/4604 382/103 |

FOREIGN PATENT DOCUMENTS

| | | |
|---|---|---|
| JP | 2007071403 | 3/2007 |
| JP | 03975215 | 6/2007 |

(Continued)

*Primary Examiner* — William H McCulloch, Jr.
*Assistant Examiner* — Yingchuan Zhang
(74) *Attorney, Agent, or Firm* — Lex IP Meister, PLLC

(57) ABSTRACT

A laser shooting training system includes a target device including a target area and a camera for photographing the target area, and an analysis device for calculating a coordinate of a laser discharged to the target area based on an image photographed by the camera, and displaying a spotted position corresponding to the laser coordinate to a user display screen. The analysis device calculates a center (Continued)

coordinate of a laser area included in the image, corrects the center coordinate based on a correction value relating to a size of the laser area, and calculates the laser coordinate.

16 Claims, 12 Drawing Sheets

(51) Int. Cl.
*F41J 5/02* (2006.01)
*F41J 5/08* (2006.01)
*F41J 5/14* (2006.01)
*G06K 9/46* (2006.01)
*G06T 7/00* (2017.01)
*F41A 33/02* (2006.01)

(52) U.S. Cl.
CPC . *F41J 5/08* (2013.01); *F41J 5/14* (2013.01); *G06K 9/4604* (2013.01); *G06T 7/0002* (2013.01); *G06T 2207/30242* (2013.01)

(56) References Cited

FOREIGN PATENT DOCUMENTS

| KR | 20030069095 | * | 2/2002 | ........... F41G 3/2616 |
|----|-------------|---|--------|---------------------|
| KR | 10 0751503 | | 8/2007 | |
| KR | 10 2010 0001754 | | 1/2010 | |
| KR | 10 2013 0056105 | | 5/2013 | |

* cited by examiner

Fig. 10

Register shooter

Unit: 83 maintenance ▼    Rank: Technical sergeant ▼

Military service number    Name type
Atype: Pistol ▼

Check

Fig. 11

| Firing record and analysis |
|---|
| November 28, 2012   10 h 48 min |
| November 28, 2012   10 h 49 min |
| November 28, 2012   13 h 35 min |
| November 28, 2012   16 h 06 min |
| November 28, 2012   08 h 50 min |
| December 05, 2012   08 h 51 min |
| November 01, 2013   14 h 25 min |

LASER SHOOTING TRAINING SYSTEM AND METHOD

TECHNICAL FIELD

The present invention relates to a laser shooting training system and method.

BACKGROUND ART

Target practice is performed to improve shooting performance by the army or the police. In the present day, target exercises by soldiers are performed according to a program including a schedule, personnel, a space, and an amount of live ammunition for respective men. It is difficult to allow an additional target exercise in limited conditions because of the danger of the target practice. Particularly, when target practice using actual guns is performed, an additional space with a secure facility is needed and a large cost is incurred. Therefore, a target practice simulating system for allowing the target practice at any place is needed.

The target practice simulating system generally uses laser beams, and according to a characteristic of the laser beams, the laser beams are not directed to a single point but are scattered in a target area. Therefore, it is not easy for the target practice simulating system to find an accurate position of the laser beams that are spotted in the target area through image analysis. It is needed to find the accurate spotted position of the laser beam so as to increase the accuracy of the target practice.

DISCLOSURE

Technical Problem

The present invention has been made in an effort to provide a laser target practicing system and method for finding an accurate spotted position of laser beams by analyzing an image acquired by photographing the laser beams fired to a target area.

Technical Solution

An exemplary embodiment of the present invention provides a laser shooting training system. The laser shooting training system includes a target device including a target area and a camera for photographing the target area; and an analysis device for calculating a coordinate of a laser discharged to the target area based on an image photographed by the camera, and displaying a spotted position corresponding to the laser coordinate to a user display screen. The analysis device calculates a center coordinate of a laser area included in the image, corrects the center coordinate based on a correction value relating to a size of the laser area, and calculates the laser coordinate.

The analysis device may filter the image with a color of the laser beams to extract the laser area.

The analysis device may find a first average coordinate of pixels included in the laser area, and may calculate a second average coordinate of pixels that are acquired by excluding pixels that are distant from the first average coordinate by more than a specific distance from the pixels included in the laser area as the center coordinate.

The analysis device may correct the center coordinate based on a correction value relating to a size of the laser area and may extract the laser coordinate when the size of the laser area is greater than a predetermined reference, and the correction value relating to the size of the laser area may be a value for moving the center coordinate in a center direction of the target area.

The analysis device may extract the center coordinate as the laser coordinate when the size of the laser area is equal to or less than a predetermined reference.

The analysis device may correct the laser coordinate based on a distance and angle information of the target area and the camera so that the camera may correct an image distortion generated at a position where the target area is photographed.

The analysis device may convert the laser coordinate into the spotted position displayed on the user display screen based on a ratio of the target on the user display screen and the target included in the image.

The analysis device may display a score corresponding to the spotted position.

The analysis device may analyze the image to extract shaking information of laser beams.

The analysis device may set a total number of shots, may count the number of shots each time the laser beams are discharged, may determine whether it reaches the total number of shots, and upon reaching the total number of shots, may change a mode.

Another embodiment of the present invention provides a method for operating a laser shooting training system. The method includes storing correction values for respective sizes of a laser area; receiving an image generated by photographing a target area, calculating a center coordinate of a laser area included in the image, correcting the center coordinate based on a correction value relating to a size of the laser area and calculating a laser coordinate, and displaying a spotted position corresponding to the laser coordinate to a user display screen.

The calculating of a center coordinate of a laser area may include filtering the image with a color of the laser beams and extracting the laser area.

The calculating of a center coordinate of a laser area may include finding a first average coordinate of pixels included in the laser area, and calculating a second average coordinate of pixels that are acquired by excluding pixels that are distant from the first average coordinate by more than a specific distance from the pixels included in the laser area as the center coordinate.

The calculating of a laser coordinate may include correcting the center coordinate based on a correction value relating to a size of the laser area and extracting the laser coordinate when the size of the laser area is greater than a predetermined reference, and extracting the center coordinate as the laser coordinate when the size of the laser area is equal to or less than a predetermined reference.

The storing of correction values for respective sizes of a laser area may include finding a center coordinate of a laser area corresponding to a plurality of discharged laser beams, extracting a correction value for moving each of center coordinates to an actual laser position spotted to the target area, allowing the correction value to correspond to a size of the corresponding laser area, and generating correction values for respective sizes of the laser area.

The displaying to a user display screen may include converting the laser coordinate into the spotted position displayed to the user display screen based on a ratio of a target of the user display screen and a target included in the image.

The method may further include displaying a score corresponding to the spotted position.

The displaying of a score may include determining whether the spotted position misses a target of the user display screen and providing a score.

Advantageous Effects

According to an exemplary embodiment of the present invention, the accurate laser beam spotted position may be detected. Therefore, according to an exemplary embodiment of the present invention, the accuracy of the target practice may be increased and the fine difference of spotted positions may be distinguished.

DESCRIPTION OF THE DRAWINGS

FIG. 9 to FIG. 12 respectively show an example of a user interface screen an exemplary embodiment of the present invention.

MODE FOR INVENTION

Figure 1:
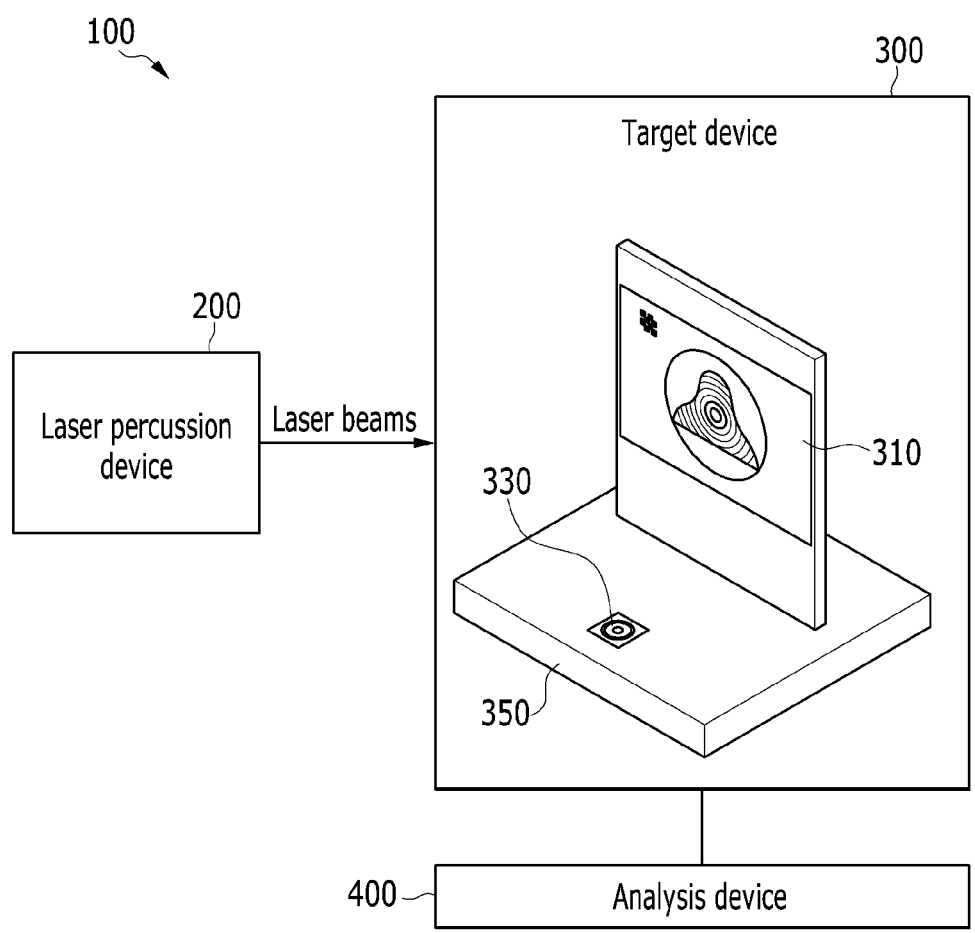
FIG. 1 shows a block diagram of a laser shooting training system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In addition, the terms "-er," "-or," and "module" described in the specification mean units for processing at least one function and operation, and can be implemented by hardware components or software components and combinations thereof.

Figure 2:
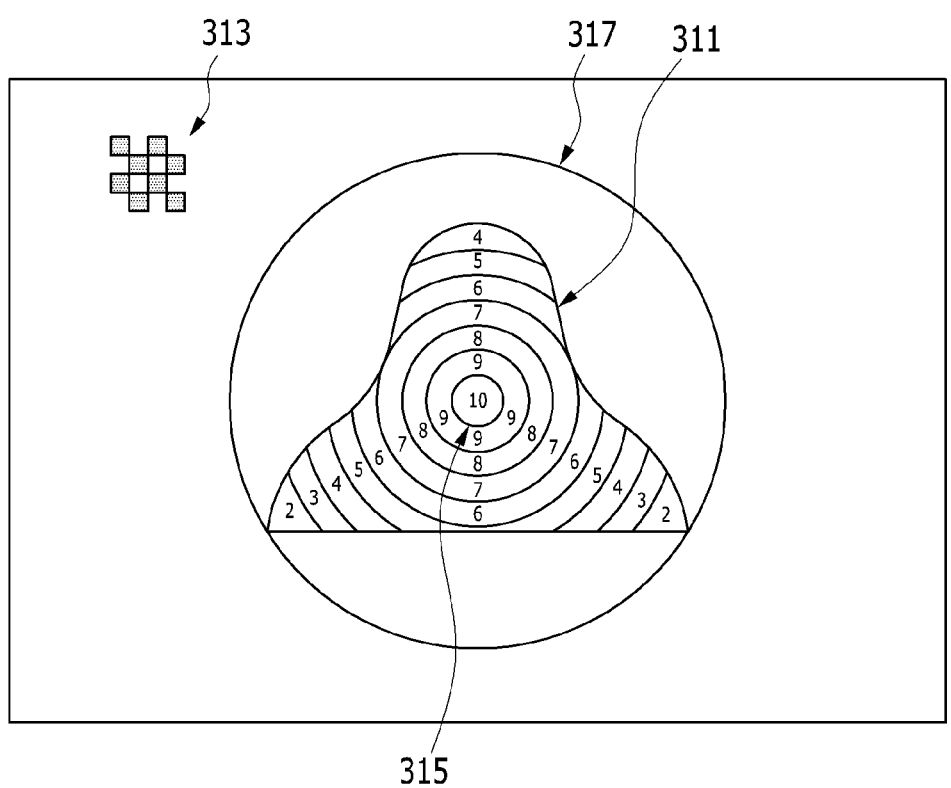
FIG. 2 shows an example of a target area according to an exemplary embodiment of the present invention.
Figure 3:
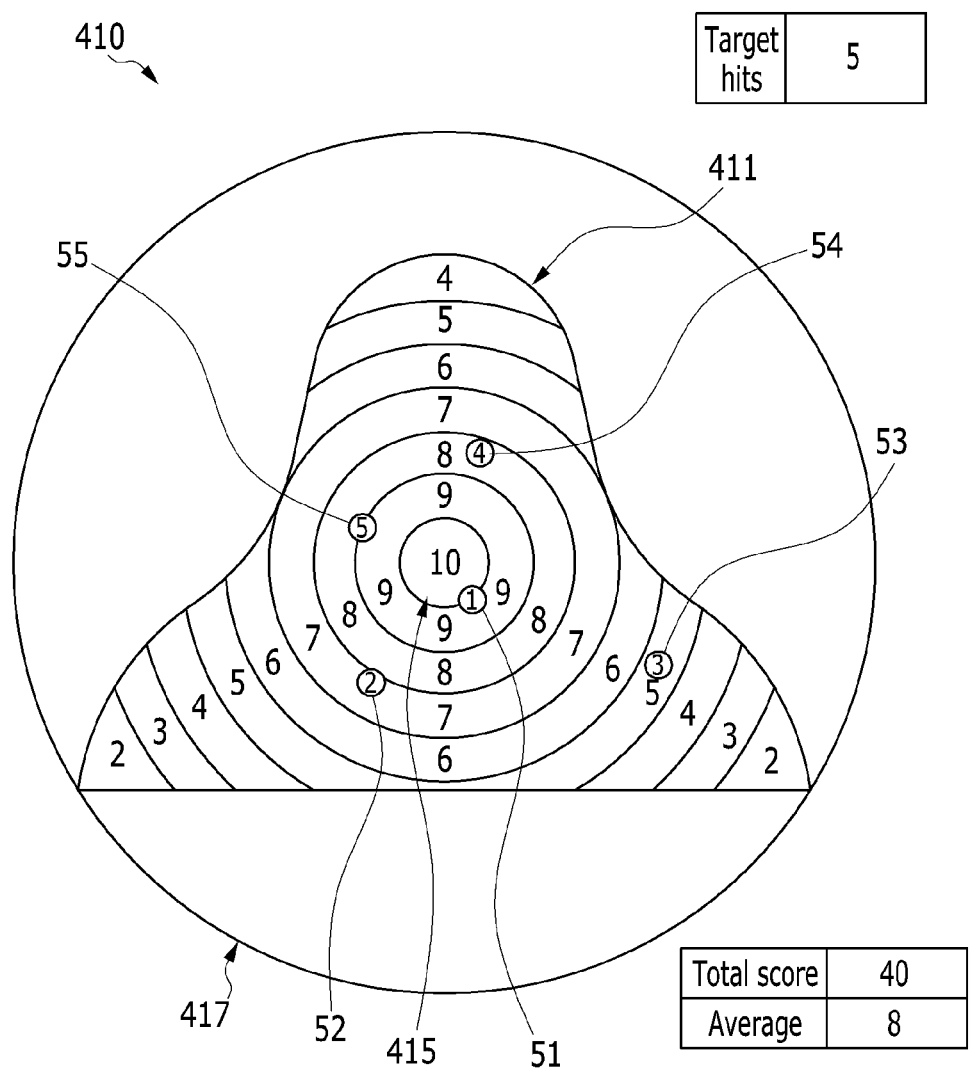
FIG. 3 shows an example of a user display screen according to an exemplary embodiment of the present invention.

FIG. 1 shows a block diagram of a laser shooting training system according to an exemplary embodiment of the present invention, FIG. 2 shows an example of a target area according to an exemplary embodiment of the present invention, and FIG. 3 shows an example of a user display screen according to an exemplary embodiment of the present invention.

Referring to FIG. 1, the laser shooting training system 100 includes a laser percussion device 200, a target device 300, and an analysis device 400.

The laser percussion device 200 discharges laser beams. The laser percussion device 200 is mounted on a firearm, and it may discharge laser beams when a user pulls a trigger.

The target device 300 includes a target area 310, a camera 330, and a transceiver 350. Referring to FIG. 2, the target area 310 represents a device on which a target 311 is drawn. The target area 310 includes an align mark 313 that is a reference when the analysis device 400 aligns an image, a center mark 315, and a reference circle 317. Regarding the target 311, scores may be set at predetermined intervals from the center mark 315, and a shape of the target may be variable.

The camera 330 is disposed to photograph the target area. A position of the camera 330 may be various, and for example, the camera 330 may be provided at a front bottom end of the target area 310 and may photograph the target area.

The transceiver 350 transmits an image photographed by the camera 330 to the analysis device 400. In this instance, the photographed image may be transmitted to the analysis device 400 in a radio or wired manner.

The analysis device 400 receives an image photographed of the target area from the target device 300. Referring to FIG. 2, the analysis device 400 performs an image aligning step for recognizing the center mark 315 and setting the center mark 315 as a center for an image analysis. The analysis device 400 may recognize the center mark 315 and the reference circle 317 by use of the align mark 313.

The analysis device 400 calculates a laser coordinate corresponding to a spotted position of laser beams by analyzing an image (laser image) in which the laser beams are spotted in the target area. First, the analysis device 400 recognizes a color area of the laser beams from the laser image. The analysis device 400 extracts a center coordinate of the laser area.

The analysis device 400 determines the center coordinate to be a laser coordinate when a size of the laser area is equal to or less than a predetermined reference. When the size of the laser area is greater than the predetermined reference, the analysis device 400 may correct a center coordinate according to the size of the laser area. This is because, when the size of the laser area is greater than the predetermined reference, it signifies that the laser beams are scattered in the target area, so there is a difference between the center of the laser area and the position where the laser beams are actually spotted. Therefore, the center coordinate must be corrected according to a scattered degree of the laser beams, that is, the size of the area. A correction value represents a value for moving the center coordinate of a certain laser area to a spotted position (highlighted position) of the actual laser beams. Before a target practice, the correction values are set for the respective sizes of the laser area. The analysis device 400 may correct the center coordinate to be close to the center mark based on the correction values for the respective sizes of the laser area.

The camera 330 is provided at the front bottom end of the target area 310 so the photographed image is distorted as shown in FIG. 2. That is, a target score gap looks narrower toward a top of the center mark 315. Therefore, the analysis device 400 may correct the distortion degree of the center coordinate or the corrected center coordinate based on the positions of the target area 310 and the camera 330.

The analysis device 400 may provide a user display screen 410 shown in FIG. 3. The user display screen 410 displays a predetermined size of a target 411, a center mark 415, and a target circumference circle 417. The center mark 315 corresponds to the center mark 415 through an image alignment stage.

The analysis device 400 determines a laser spotted position based on the laser coordinate. The analysis device 400 displays laser spotted positions (51, 52, 53, 54, and 55) to the user display screen 410. The score is set according to a distance from the center mark. The score may be set to be 0 when the laser spotted position is near the center mark but misses a man-shaped target.

In this instance, a target scale of the user display screen is different from a target scale photographed from the actual image. The analysis device 400 may not allow the laser coordinate to correspond to the target of the user display screen 410 as it is. Therefore, the analysis device 400 calculates a ratio of the target circumference circle 417 on the reference circle 317 as a scaling value. The analysis device 400 scales the laser coordinate with the scaling value, and maps the scaled coordinate on the user display screen 410.

In another way, the analysis device 400 may calculate a distance from the center mark and a direction based on the laser coordinate. The score caused by the distance at the center mark 415 on the user display screen 410 is fixed. The analysis device 400 scales the calculated distance with a scaling value to convert the same into a distance on the user display screen 410. The analysis device 400 determines to what range of scores the scaled distance corresponds on the user display screen 410. The analysis device 400 indicates the spotted position in the calculated direction of the corresponding range of scores, for example, the three-o'clock direction (0-degree direction).

The analysis device 400 may extract shaking information of the laser beams. The analysis device 400 calculates the distance by which an xy-coordinate moves for 0.2 s, calculates the distance between the initial position and the last position and the direction, and provides shaking information. The shaking information is used as data for analyzing a firing propensity and a firing problem of the user.

The analysis device 400 provides various interfaces for the target practice simulation. The analysis device 400 may provide a shooter registration screen. Through this, the analysis device 400 may manage user information. The analysis device 400 may provide a screen for providing a shot record.

The analysis device 400 may display the score on the user display screen, and may output it as a voice.

The analysis device 400 sets a total number of shots, and counts the number of shots each time the laser beams are discharged. The analysis device 400 may be operable in a shot preparing and discharging mode when the shot does not reach the total number of shots, and the analysis device 400 may store shot data and may move to an analysis mode when it reaches the total number of shots.

Figure 4:
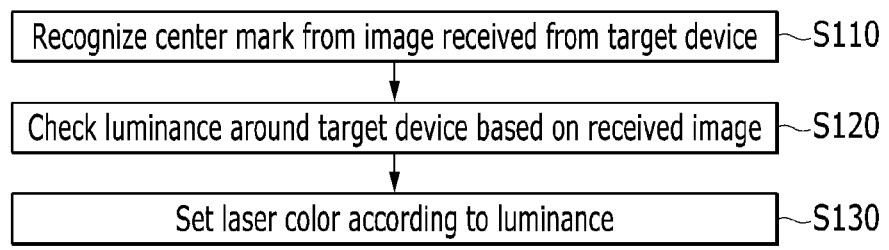
FIG. 4 and FIG. 5 show flowcharts of a laser beam analysis method according to an exemplary embodiment of the present invention.
Figure 5:
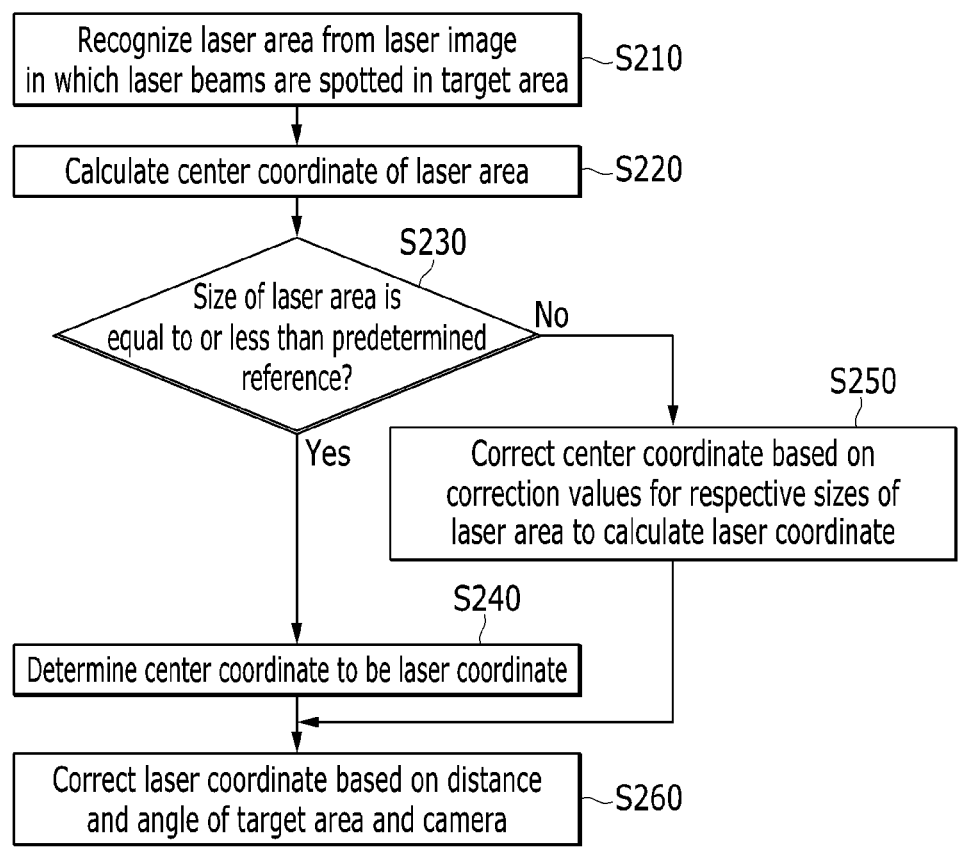
Figure 6:
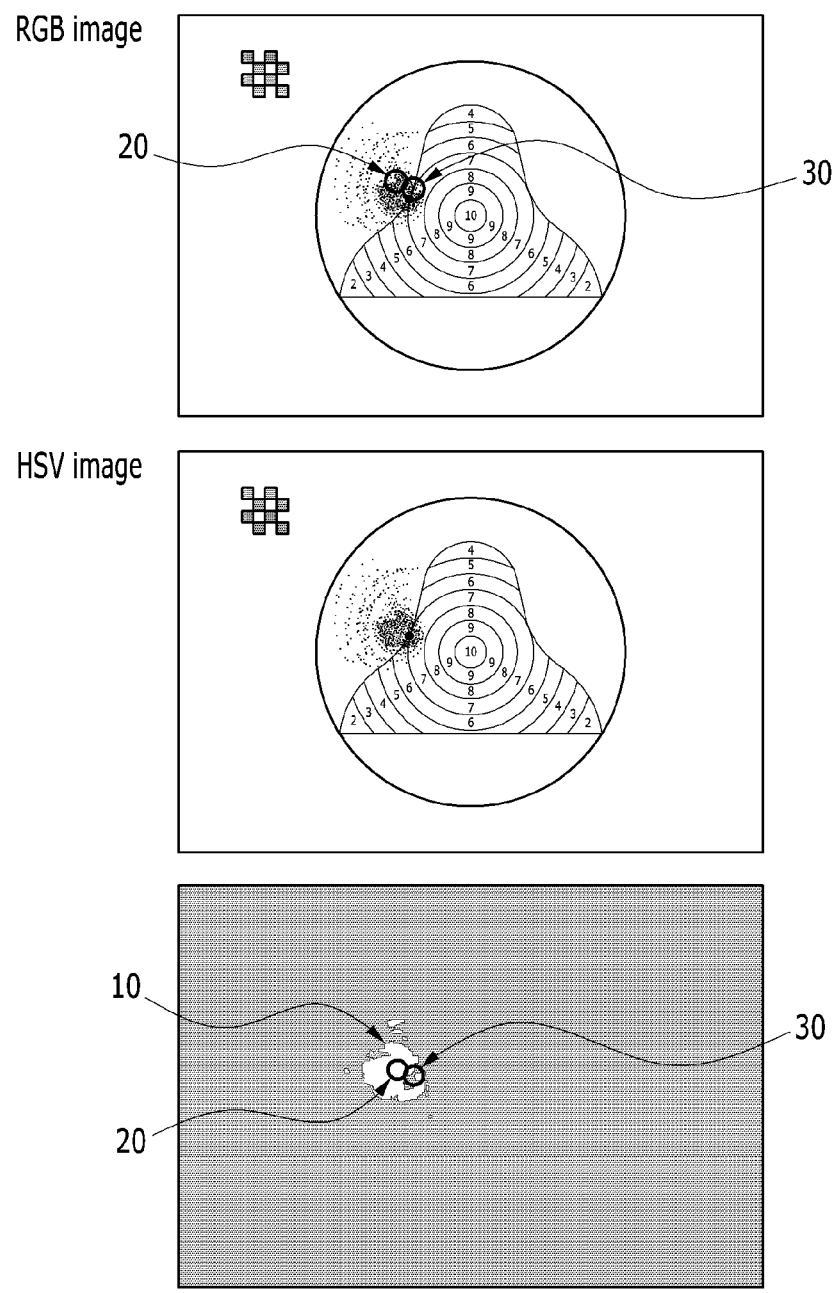
FIG. 6 shows a method for correcting a color area of laser beams and a laser coordinate according to an exemplary embodiment of the present invention.

FIG. 4 and FIG. 5 show a flowchart of a laser beam analysis method according to an exemplary embodiment of the present invention and FIG. 6 shows a method for correcting a color area of laser beams and a laser coordinate according to an exemplary embodiment of the present invention.

Referring to FIG. 4, the analysis device 400 aligns an image before firing of laser beams, and performs a mode for setting a laser beam color.

The analysis device 400 recognizes the center mark 315 from the image received from the target device 300 (S110). The analysis device 400 recognizes the center mark 315 of the target area 310 by using the align mark 313, and sets the center mark 315 as a center for an image analysis.

The analysis device 400 checks luminance around the target device 300 based on the received image (S120).

The analysis device 400 sets a certain laser color based on the laser color set according to the luminance (S130).

Referring to FIG. 5, the analysis device 400 having passed through the setting mode performs a laser target practice mode.

The analysis device 400 recognizes a laser area 10 from the laser image in which the laser beams are spotted in the target area (S210). Referring to FIG. 6, the analysis device 400 converts an RGB laser image into an HSV image. The analysis device 400 does not process red-based pixels corresponding to a laser color in the HSV image, and filters the remaining pixels with white. The analysis device 400 filters the red-based pixels to convert into a threshold image (black and white image). Here, the pixels in the white color area represent the laser area 10.

The analysis device 400 calculates the center coordinate of the laser area (S220). Referring to FIG. 6, the analysis device 400 calculates the center coordinate 20 of the laser area based on the pixels of the laser area 10. A method for calculating the center coordinate of the laser area may be various, and the analysis device 400 may find an average coordinate of the pixels that are provided inside or on a border of the laser area, and may set the average coordinate of the pixels excluding the pixels that are further distant from the average coordinate by a specific distance as the center coordinate.

The analysis device 400 determines whether the size of the laser area is equal to or less than a predetermined reference (S230).

When it is equal to or less than a predetermined reference, the analysis device 400 determines the center coordinate to be the laser coordinate (S240).

When it is greater than a predetermined reference, the analysis device 400 corrects the center coordinate based on the correction values for the respective sizes of the laser area to calculate the laser coordinate (S250). When the camera is provided at a front bottom end of the target area, the analysis device 400 corrects the center coordinate so that it may be close to the center mark. Referring to FIG. 6, the analysis device 400 corrects the center coordinate 20 with the laser coordinate 30. The analysis device 400 sets the correction values for the respective sizes of the laser area before target practice.

When the laser beams are discharged, light coming into the camera is scattered in respective directions with reference to the center of the camera. The analysis device 400 may generate a difference between the spotted position of the actual laser beams and the center coordinate of the laser area according to the size of the recognized laser area. To reduce such an error, the analysis device 400 corrects the center coordinate by using the correction values for the respective sizes of the laser area expressed in Table 1. The correction values according to the sizes of the laser area are values that are needed to move the center coordinate of the corresponding laser area to the actual spotted position (highlighted position seen in the image) of the laser beams. The correction values according to the respective sizes of the laser area are determined based on a result of a plurality of tests for moving the center coordinate to the highlighted position that is the actual position of the laser beams in the image acquired by photographing the target area. For example, when the center laser coordinate 30 is (x, y), the laser coordinate 30 that is corrected based on the scattered degree of the laser beams is (x*correction value, y*correction value). A unit of the laser area may be different depending on a size measuring method, and for example, it may be the number of pixels.

TABLE 1

| Sizes of the laser area | Correction values |
| --- | --- |
| Equal to or less than 300 | Not corrected |
| Greater than 300 | 0.8 |
| 400 | 0.75 |
| 500 | 0.7 |
| 600 | 0.6 |
| — | — |

The analysis device 400 corrects the laser coordinate based on a distance and an angle of the target area 310 and the camera 330 (S260). Referring to FIG. 6, the camera 330 is provided at the front bottom end of the target area 310, so a target score gap looks narrower as it goes upward in the photographed image. That is, the laser coordinate calculated through the image may be different from the coordinate in the actual target area. Therefore, when such an image distortion is provided, the analysis device 400 corrects the laser coordinate 30 as the coordinate in the actual target area based on the distance and the angle of the target area 310 and the camera 330.

Figure 7:
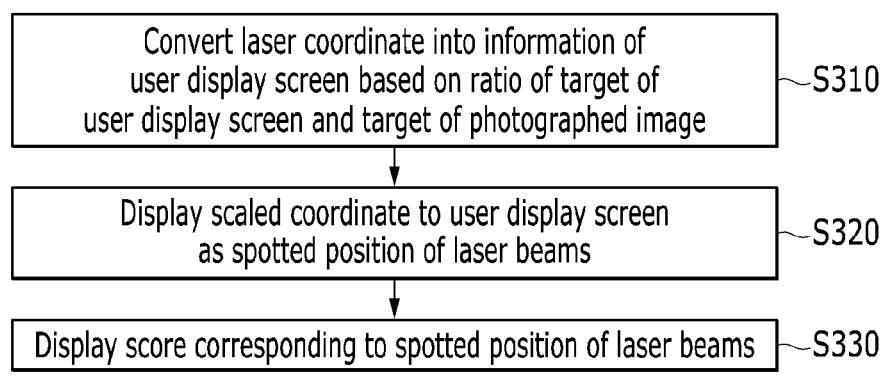
FIG. 7 shows a flowchart of a laser beam analysis method according to another exemplary embodiment of the present invention.

FIG. 7 shows a flowchart of a laser beam analysis method according to another exemplary embodiment of the present invention.

Referring to FIG. 7, the analysis device 400 converts the laser coordinate into information of the user display screen 410 based on a ratio of the target of the user display screen and the target of the photographed image (S310). The target of the user display screen and the target photographed from the actual image have different scales so the analysis device 400 may not allow the laser coordinate to correspond to the target of the user display screen 410. Therefore, the analysis device 400 uses a ratio of the target circumference circle 417 on the reference circle 317 as a scaling value. The analysis device 400 may scale the laser coordinate with a scaling value, and may map the scaled coordinate on the user display screen 410.

The analysis device 400 displays the scaled coordinate to the user display screen 410 as the spotted position of the laser beams (S320).

The analysis device 400 displays a score corresponding to the spotted position of the laser beams (S330). For example, as expressed in Table 2, when two points to ten points are assigned depending on the distance from the center mark, the analysis device 400 calculates the score based on the distance between the spotted position of laser beams and the center mark. In the case of Table 2, a radius of the target circumference circle 417 is 440. The analysis device 400 calculates it to be 0 points when the spotted position of the laser beams misses the man-shaped target.

Figure 8:
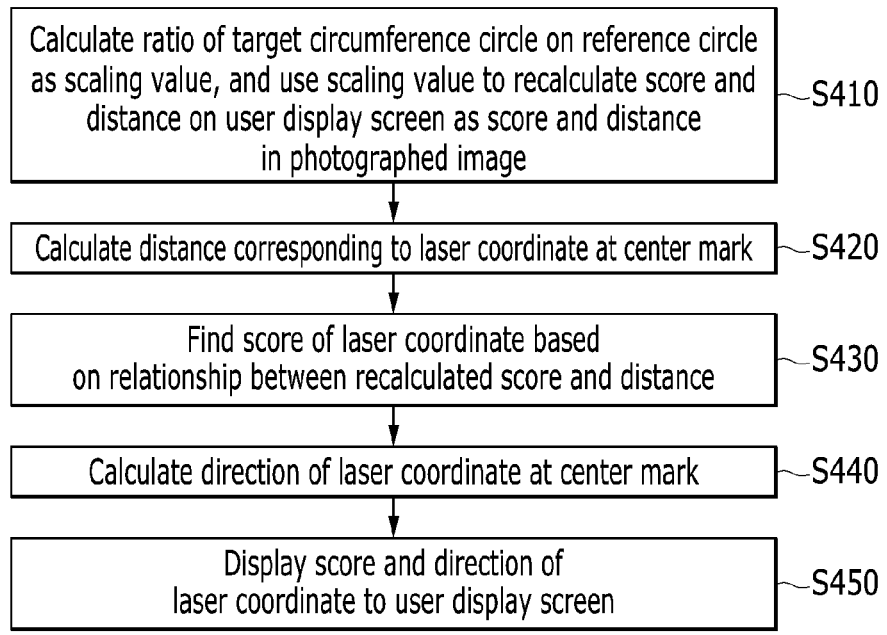
FIG. 8 shows a flowchart of a laser beam analysis method according to the other exemplary embodiment of the present invention.

FIG. 8 shows a flowchart of a laser beam analysis method according to the other exemplary embodiment of the present invention.

Referring to FIG. 8, the analysis device 400 may mark the spotted position and calculate the score with a different method from that of FIG. 7.

The analysis device 400 calculates a ratio of the target circumference circle 417 on the reference circle 317 as a scaling value, and uses the scaling value to recalculate the score and the distance on the user display screen 410 as a score and a distance in the photographed image (S410). For example, when the radius of the target circumference circle 417 is 440 and the radius of the reference circle 317 is 220, the scores according to the distance from the center mark 315 in the photographed image are expressed in Table 3.

TABLE 3

| | Scores | | | | |
| --- | --- | --- | --- | --- | --- |
| | 10 points | 9 points | — | 3 points | 2 points |
| Distance to the center mark | 90 * 0.5 | 176 * 0.5 | — | 721 * 0.5 | 880 * 0.5 |

The analysis device 400 calculates the distance corresponding to the laser coordinate 40 at the center mark (S420).

The analysis device 400 finds the score of the laser coordinate 40 based on the relationship between the recalculated score and the distance of Table 3 (S430).

The analysis device 400 calculates a direction of the laser coordinate 40 at the center mark (S440). The direction may be calculated in a clockwise direction or as an angle.

The analysis device 400 displays a score and a direction of the laser coordinate 40 to the user display screen 410 (S450).

FIG. 9 to FIG. 12 respectively show an example of a user interface screen in an exemplary embodiment of the present invention.

Figure 9:
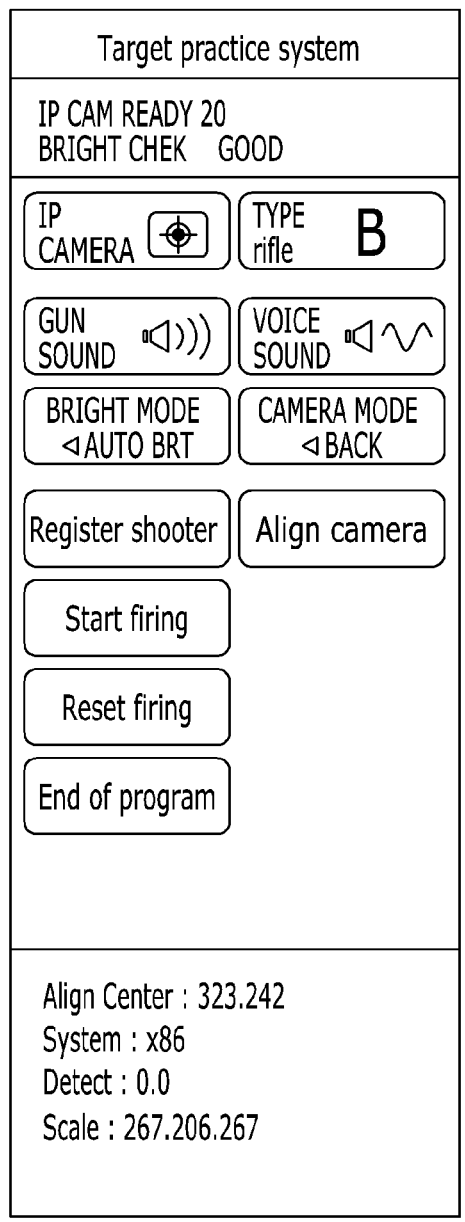

Referring to FIG. 9, the analysis device 400 may provide a menu for setting the camera 330, a type of the laser percussion device 200, a sound when the laser beams are discharged, a speech sound, and checking states. The analysis device 400 may provide coordinate information of the center.

The analysis device 400 may provide a shooter registration menu 500 for registering the shooter. When the shooter registration menu 500 is selected, a shooter registration screen as shown in FIG. 10 is displayed.

The analysis device 400 provides an interface screen for displaying a camera aligning menu used in a step for aligning the camera at an earlier stage, a firing start menu for starting firing, a firing resetting menu, and a program type menu.

Referring to FIG. 11, the analysis device 400 provides an interface screen for storing a firing record and showing the same.

TABLE 2

| | Scores | | | | | | | | |
| --- | --- | --- | --- | --- | --- | --- | --- | --- | --- |
| | 10 points | 9 points | 8 points | 7 points | 6 points | 5 points | 4 points | 3 points | 2 points |
| Distance to the center mark | 90 | 176 | 267 | 358 | 449 | 539 | 630 | 721 | 880 |

Figure 12:
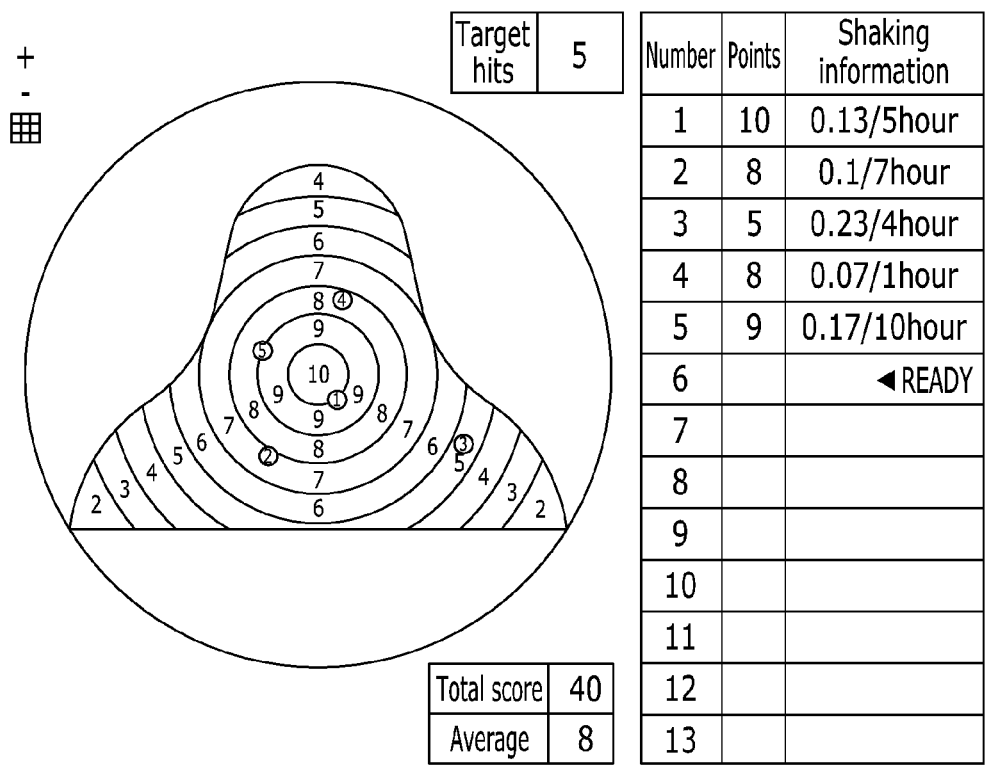

Referring to FIG. 12, the analysis device 400 may analyze shaking information of laser beams. The analysis device 400 calculates the distance by which an xy-coordinate moves for 0.2 s, calculates the distance between the initial position and the last position and the direction, and provides shaking information. The shaking information is used as data for analyzing a firing propensity and a firing problem of the user.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A laser shooting training system comprising:
   a target device including a target area and a camera for photographing the target area; and
   an analysis device for calculating a coordinate of a laser discharged to the target area based on an image photographed by the camera, and displaying a spotted position corresponding to the laser coordinate to a user display screen,
   wherein the analysis device calculates a center coordinate of a laser area included in the image, corrects the center coordinate based on a correction value relating to a size of the laser area when the size of the laser area is greater than a predetermined reference, and calculates the corrected center coordinate as the laser coordinate,
   wherein the analysis device extracts the calculated center coordinate as the laser coordinate when the size of the laser area is equal to or less than the predetermined reference, and
   wherein the size of the laser area is determined by a certain number of pixels encompassed within the size of the laser area.

2. The laser shooting training system of claim 1, wherein the analysis device filters the image with a color of the laser beams to extract the laser area.

3. The laser shooting training system of claim 1, wherein the analysis device finds a first average coordinate of pixels included in the laser area, and calculates a second average coordinate of pixels that are acquired by excluding pixels that are distant from the first average coordinate by more than a specific distance from the pixels included in the laser area as the center coordinate.

4. The laser shooting training system of claim 1, wherein the correction value relating to the size of the laser area is a value for moving the center coordinate in a center direction of the target area.

5. The laser shooting training system of claim 1, wherein the analysis device corrects the laser coordinate based on a distance and angle information of the target area and the camera so that the camera may correct an image distortion generated at a position where the target area is photographed.

6. The laser shooting training system of claim 1, wherein the analysis device converts the laser coordinate into the spotted position displayed on the user display screen based on a ratio of the target on the user display screen and the target included in the image.

7. The laser shooting training system of claim 1, wherein the analysis device displays a score corresponding to the spotted position.

8. The laser shooting training system of claim 1, wherein the analysis device analyzes the image to extract shaking information of laser beams.

9. The laser shooting training system of claim 1, wherein the analysis device sets a total number of shots, counts the number of shots each time the laser beams are discharged, determines whether it reaches the total number of shots, and upon reaching the total number of shots, changes a mode.

10. A method for operating a laser shooting training system, the method comprising:
    storing correction values for respective sizes of a laser area while the laser shooting training system is at a setting mode;
    receiving an image generated by photographing a target area while the laser shooting training system is at a target practice mode;
    calculating a center coordinate of a laser area included in the image while the laser shooting training system is at the target practice mode;
    correcting the center coordinate based on a correction value relating to a size of the laser area when the size of the laser area is greater than a predetermined reference and calculating a laser coordinate while the laser shooting training system is at the target practice mode; and
    displaying a spotted position corresponding to the laser coordinate to a user display screen,
    wherein calculating the laser coordinate includes
    extracting the corrected center coordinate as the laser coordinate when the size of the laser area is greater than a predetermined reference, and
    extracting the calculated center coordinate as the laser coordinate when the size of the laser area is equal to or less than the predetermined reference, and
    wherein during the target practice mode, the size of the laser area is determined by a certain number of pixels encompassed within the size of the laser area.

11. The method of claim 10, wherein
    the calculating of the center coordinate of the laser area includes
    filtering the image with a color of the laser beams and extracting the laser area.

12. The method of claim 10, wherein
    the calculating of the center coordinate of the laser area includes finding a first average coordinate of pixels included in the laser area, and calculating a second average coordinate of pixels that are acquired by excluding pixels that are distant from the first average coordinate by more than a specific distance from the pixels included in the laser area as the center coordinate.

13. The method of claim 10, wherein
    the storing of correction values for respective sizes of the laser area while the laser shooting training system is at a setting mode includes
    finding a center coordinate of a laser area corresponding to a plurality of discharged laser beams, extracting a correction value for moving each of center coordinates to an actual laser position spotted to the target area, allowing the correction value to correspond to a size of the corresponding laser area, and generating correction values for respective sizes of the laser area.

14. The method of claim 10, wherein
the displaying to a user display screen includes
converting the laser coordinate into the spotted position displayed to the user display screen based on a ratio of a target of the user display screen and a target included in the image.

15. The method of claim 10, further comprising displaying a score corresponding to the spotted position.

16. The method of claim 15, wherein
the displaying of a score includes
determining whether the spotted position misses a target of the user display screen and providing a score.

* * * * *